(12) United States Patent
Akaro et al.

(10) Patent No.: US 7,661,624 B2
(45) Date of Patent: Feb. 16, 2010

(54) AERODYNAMIC LIFTING-THRUSTING PROPULSION DEVICE

(75) Inventors: Andrey Igorevich Akaro, Moscow (RU); Anatoly Alekseevich Denisov, St. Peterburg (RU); Anatoly Mikhailovich Zelinsky, St. Peterburg (RU); Mikhail Mikhailovich Medvedev, Zhukovsky (RU)

(73) Assignee: 000 "Midera-K", Moscow (RU)

( * ) Notice: Subject to any disclaimer, the term of this patent is extended or adjusted under 35 U.S.C. 154(b) by 0 days.

(21) Appl. No.: 10/511,779

(22) PCT Filed: Apr. 14, 2003

(86) PCT No.: PCT/RU03/00156

§ 371 (c)(1),
(2), (4) Date: Oct. 15, 2004

(87) PCT Pub. No.: WO03/086857

PCT Pub. Date: Oct. 23, 2003

(65) Prior Publication Data

US 2005/0236517 A1    Oct. 27, 2005

(30) Foreign Application Priority Data

Apr. 16, 2002    (RU) .............................. 2002109755

(51) Int. Cl.
*B64C 27/08* (2006.01)

(52) U.S. Cl. ................. 244/17.23; 244/12.2; 244/23 C; 244/69; 244/6; 416/110; 416/111

(58) Field of Classification Search ............. 244/17.23, 244/6, 12.4, 12.2, 23 C, 65, 69; 416/110, 416/111
See application file for complete search history.

(56) References Cited

U.S. PATENT DOCUMENTS

| | | | | | |
|---|---|---|---|---|---|
| 1,229,243 | A | * | 6/1917 | Eberhardt | 416/99 |
| 2,589,826 | A | * | 3/1952 | Larsen | 416/111 |
| 3,246,861 | A | * | 4/1966 | Curci | 244/7 A |
| 3,762,669 | A | * | 10/1973 | Curci | 244/17.23 |

* cited by examiner

*Primary Examiner*—J. Woodrow Eldred
(74) *Attorney, Agent, or Firm*—I. Zborovsky

(57) ABSTRACT

An aerodynamic lifting-thrusting propulsion device has a frame with an axis, relative to which the frame is arranged with a possibility of rotation, a cardan joint having a cross, at least two aerodynamic surfaces, each of which is mounted on the cardan joint with a possibility of oscillations synchronously with a rotation of the frame, a rod mounted on the frame, the cardan joint being connected with the rod, the cross of the cardan joint having axes which are mutually perpendicular and located correspondingly in mutually perpendicular planes intersecting along an axis of the rod, one of the axes of the cross extending through an axis of rotation and an axis of the rod, the rod being arranged parallel to an axis of the frame, the axis of the frame being connected with each of the aerodynamic surfaces by a mechanical transmission providing a rotation of the aerodynamic surface synchronously and opposite to a rotation of the frame.

2 Claims, 5 Drawing Sheets

AERODYNAMIC LIFTING-THRUSTING PROPULSION DEVICE

BACKGROUND OF THE INVENTION

The present invention relates to aerodynamics of flying apparatuses and represents an aerodynamic lifting-thrusting propulsion device arranged on the flying apparatus for producing a lifting force and a thrust.

A rotatable carrying screw of a helicopter is known, which produces a lifting force and a thrust (A. M. Volodko "Helicopter-A Worker and a Soldier", M. publishing house DOSAFF 1984, page 82).

Vanes of the carrying screw of helicopter are known, which produce during their rotation a lifting force and a thrust force during flying of a helicopter (W. Johnson "Theory of Helicopter, V. 1, M., "Mir", 1983, page 17).

A disadvantage of the known carrying screws of a helicopter is their low efficiency of producing of a lifting force, and therefore for producing acceptable values of the lifting force it is necessary to supply a significant power. During rotation of the vanes of the carrying screw, the cross-sections of the vanes have different velocity relative to air, the lower radii of circumferences described by these cross-sections, the lower the velocity. As a result, a surface distribution of the aerodynamic force on the vanes appears to be non uniform (close to square), which significantly reduces the efficiency of producing a lifting force.

SUMMARY OF THE INVENTION

A basis of the invention is an objective of providing an aerodynamic lifting-thrust propulsion device, in which a distribution of aerodynamic force along aerodynamic surfaces is provided which is close to a uniform, that leads to a high efficiency of producing both a lifting force and a horizontal thrust.

The objective of producing an aerodynamic lifting-thrusting propulsion device is achieved in that the aerodynamic lifting-thrusting propulsion device is composed of a frame with an axis, relative to which the frame is arranged with a possibility of rotation, at least two aerodynamic surfaces each of which is fixed on a cardan joint with a possibility of oscillations synchronously with the rotation of the frame, the cardan joint is connected to a rod arranged on the frame, the axes of a cross of the cardan joint are mutually perpendicular and located correspondingly in two mutually perpendicular planes intersecting along the axis of the rod, wherein one of them extends through the axis of rotation of the frame and the axis of the rod, the rod is arranged parallel to the axis of the frame, the axis of the frame is connected with each aerodynamic surface by a mechanical transmission that provides a possibility of rotation of the aerodynamic surface synchronously and opposite to the rotation of the frame.

The provision of the frame with the axis, relative to which the frame is arranged with a possibility of rotation, at least two aerodynamic surfaces each of which is mounted on a cardan joint with a possibility of oscillations synchronously with the rotation of the frame, the attachment of the cardan joint to a rod arranged on the frame so that the axes of the cross of the cardan joint are mutually perpendicular and are located in two mutually perpendicular planes intersecting along the axis of the rod, wherein one of them extends to the axis of rotation and the axis of the rod, the placement of the rod parallel through the axis of the frame, the connection of the axis of the frame with each aerodynamic surface by a mechanical transmission providing a possibility of rotation of the aerodynamic surface synchronously and opposite to the rotation of the frame, provide a rotation of each aerodynamic surface synchronously with the movement along the circumference and in an opposite direction relative to the rod with the angular velocity equal to the angular velocity of the movement along the circumference, which produces a rectilinear (without rotation) movement of the aerodynamic surface relative to air and provides a uniform distribution of the aerodynamic forces along the aerodynamic surface, that leads to a high efficiency of the lifting force. Performing of the oscillations of each aerodynamic surface synchronously with their rotation relative to the axes of the cross of the cardan joint provides, simultaneously with production of a lifting force also, a production of a horizontal thrust.

In the aerodynamic lifting-thrusting propulsion device each aerodynamic surface can be twisted relative to the axes which are parallel to the axes of the cross of the cardan joint and extending through the aerodynamic surface which leads to a production of a moment enhancing the oscillations of the aerodynamic surface and provides a reduction of forces spent for its oscillation, and therefore reduces a power applied for the oscillations and increases the efficiency of producing the lifting force and the thrust.

The number of the aerodynamic surfaces is selected by an experimental-calculating method from the conditions of production of the required lifting force.

DESCRIPTION OF THE PREFERRED EMBODIMENTS

Figure 1:
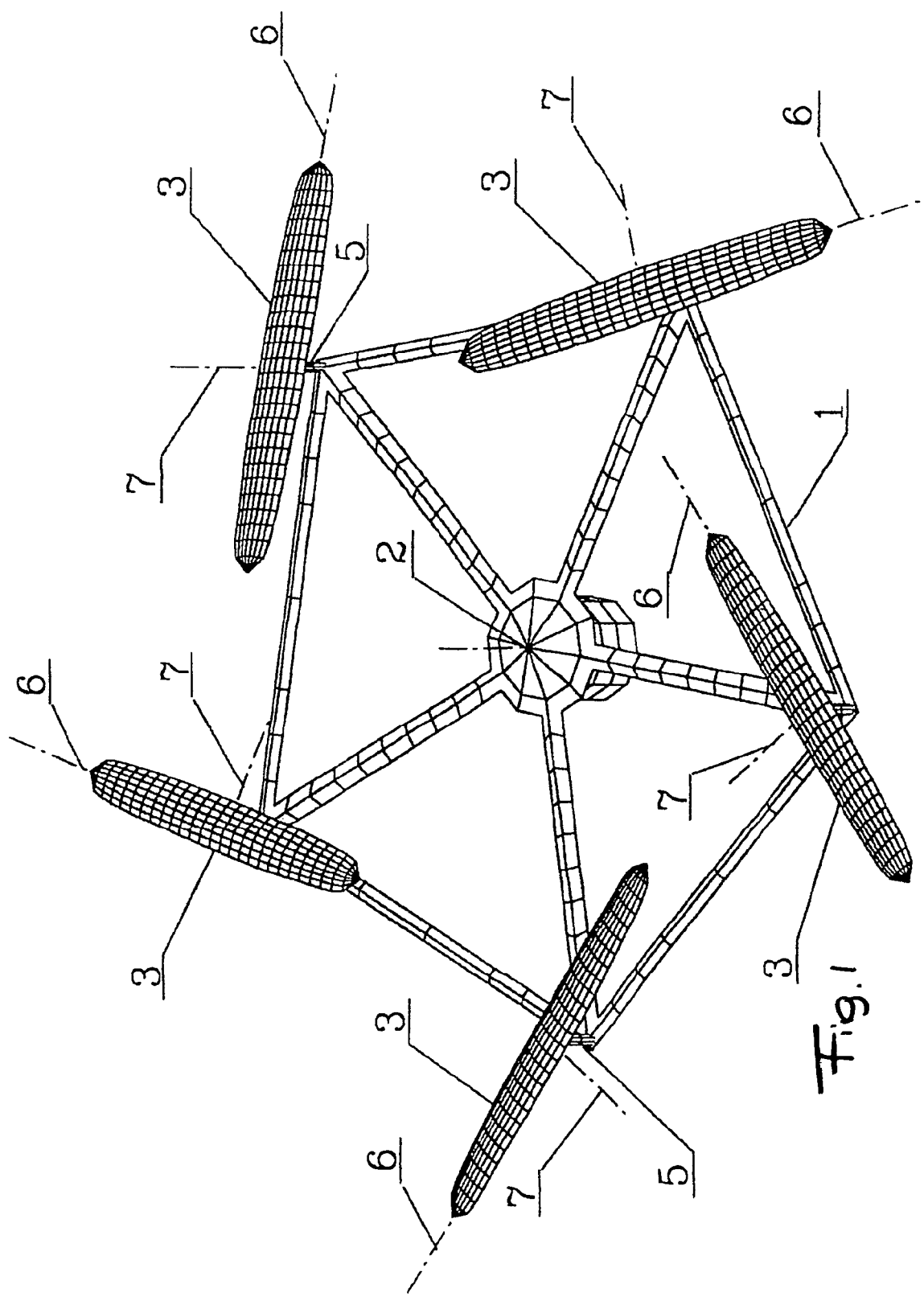
FIG. 1 shows an aerodynamic lifting-thrusting propulsion device from above.
Figure 2:
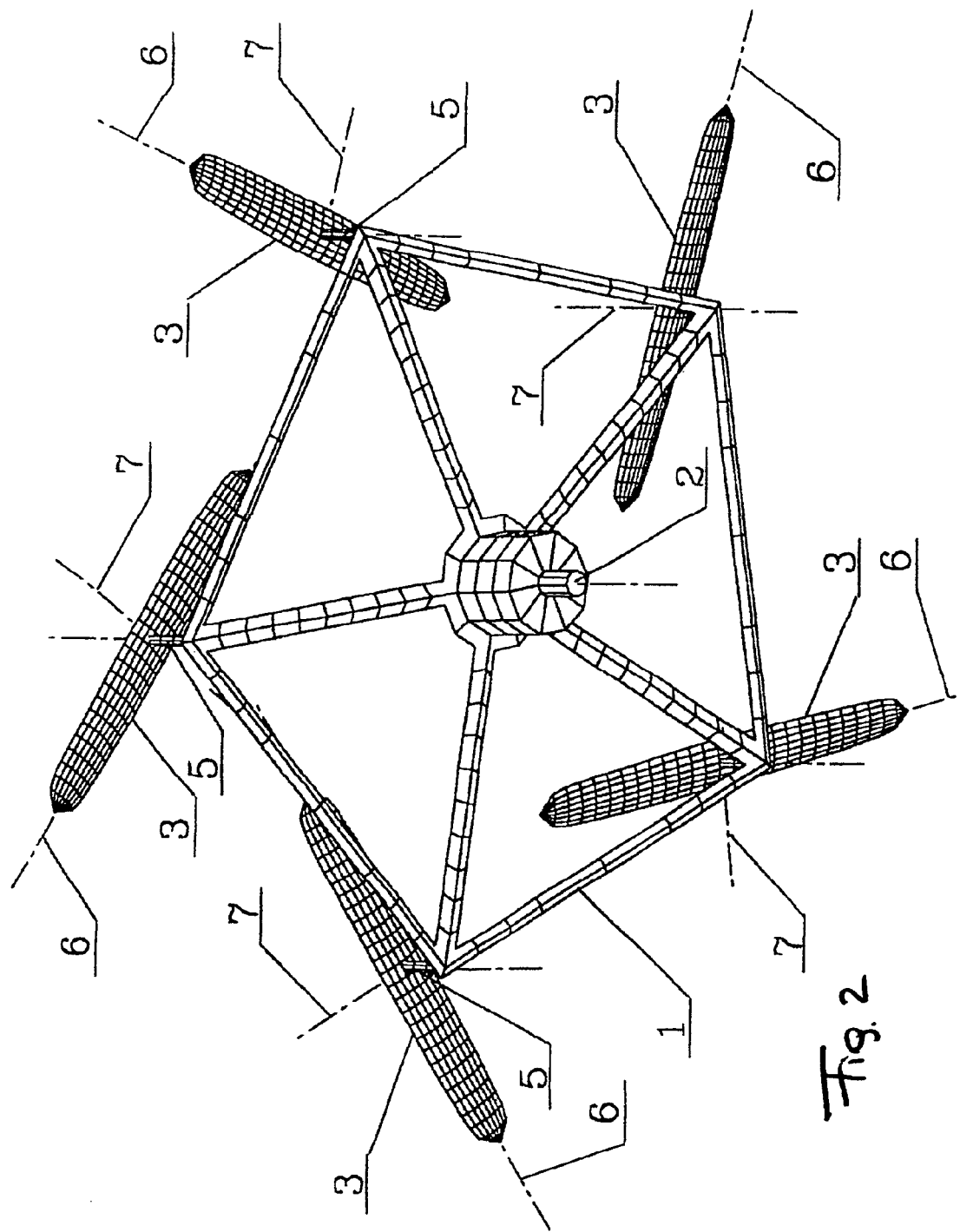
FIG. 2 shows the aerodynamic lifting-thrusting propulsion device from below.
Figure 3:
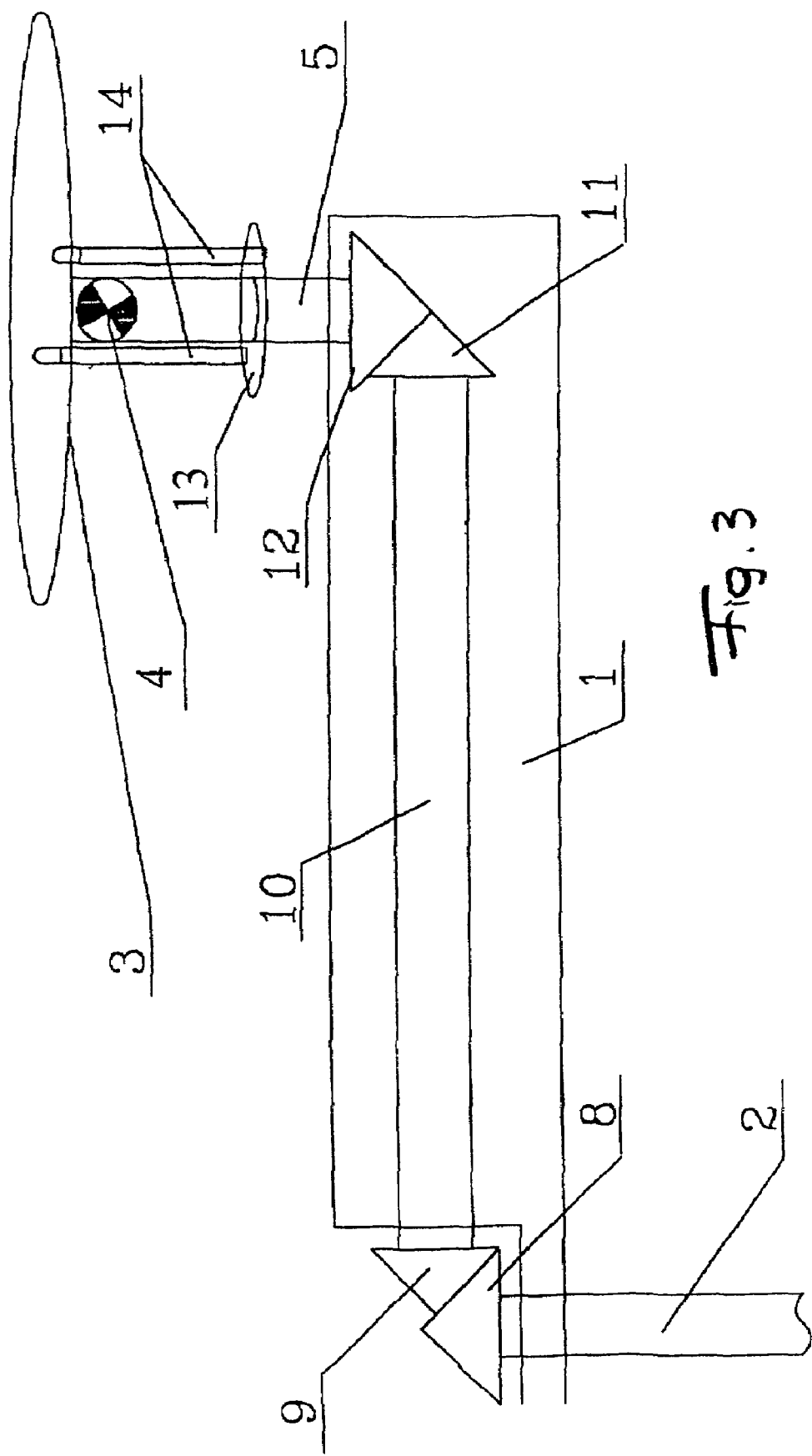
FIG. 3 shows a scheme of a mechanical transmission providing a rotation of the aerodynamic surface.
Figure 4:
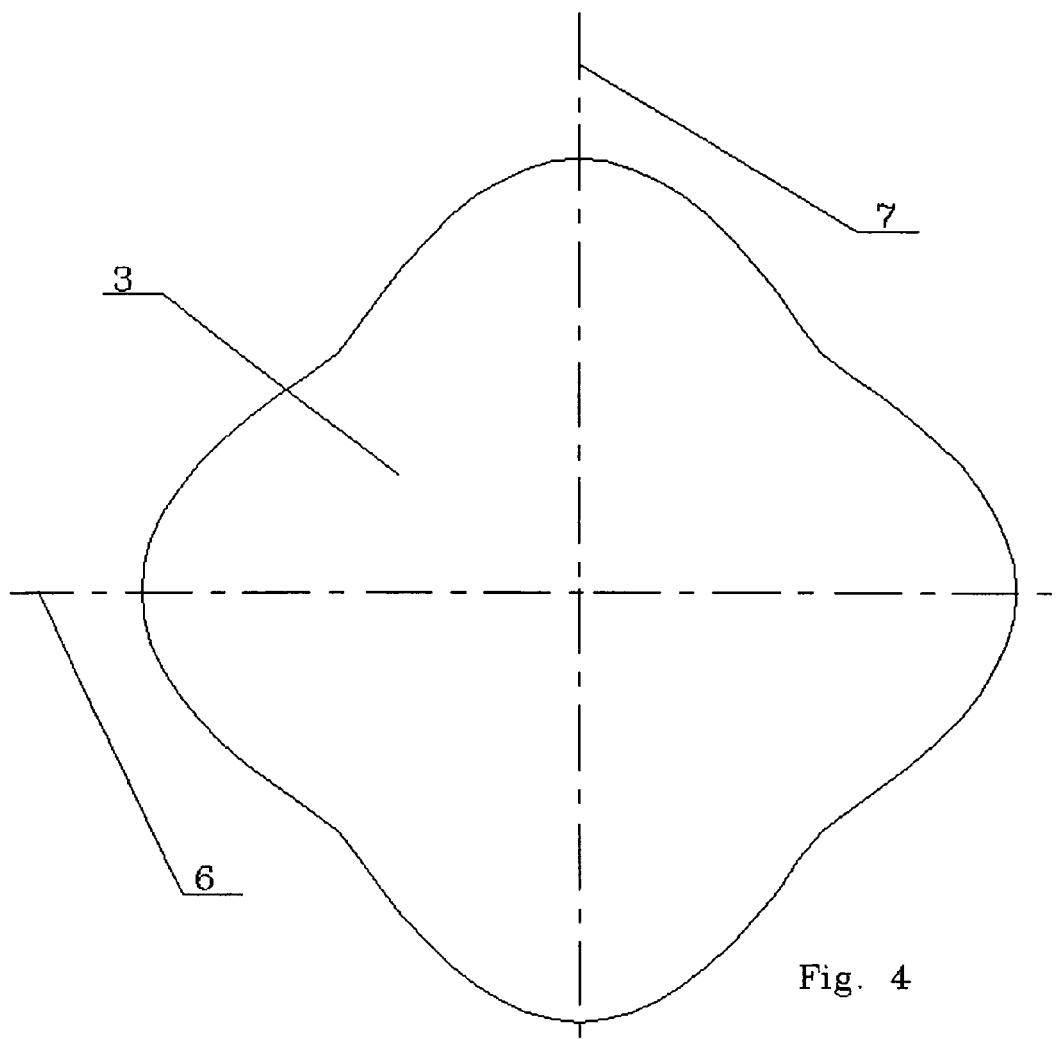
FIG. 4 is a view from the top of a twisted aerodynamic surface.
Figure 5:
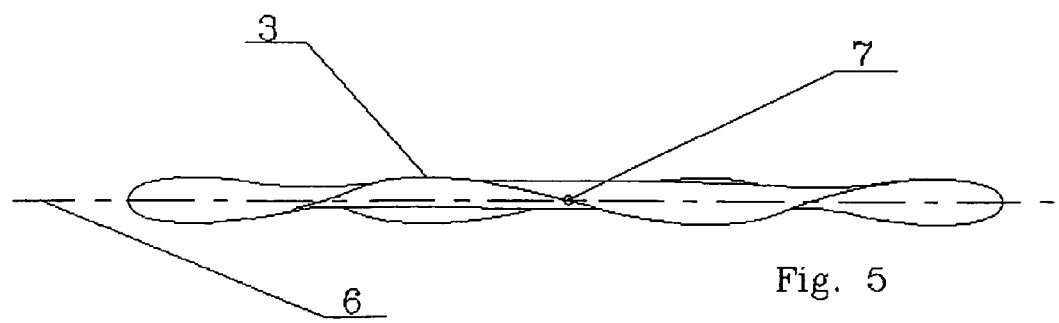
FIG. 5 is a side view of the twisted aerodynamic surface.
Figure 6:
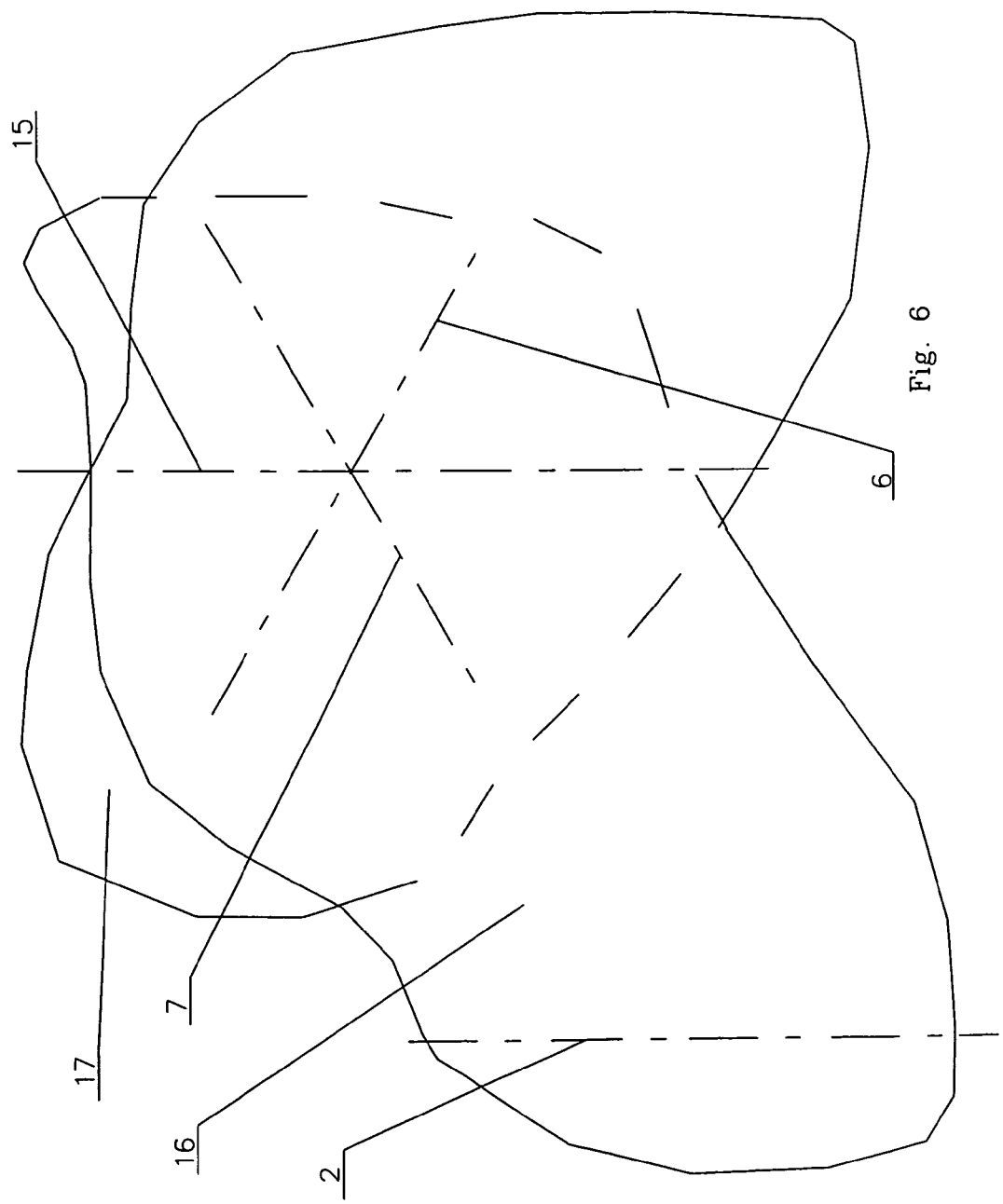
FIG. 6 is a view showing planes in which two perpendicular axes of cross of the cardan joint are located.

An aerodynamic lifting-thrusting propulsion device contains a frame 1 with an axis 2, relative to which the frame 1 is arranged with a possibility of rotation. A drive of rotation of the frame 1 relative to the axis 2 (not shown in the drawings) can be formed as an engine arranged on the axis 2, on whose shaft a spider is mounted, and on the frame 1 on the other axis fixed to it a second spider is arranged, wherein both spiders are connected by a drive chain. There are at least two aerodynamic surfaces 3, each of which is fixed on a cardan joint 4 (FIG. 3) with a possibility of oscillations synchronously with the rotation of the frame 1. The cardan joint 4 is connected to a rod 5 mounted on the frame 1, the rod 5 is mounted parallel to the axis 2. The axes 6 and 7 of a cross of the cardan joint 4 are mutually perpendicular and located correspondingly in two mutually perpendicular planes, intersecting along an axis of the rod 5, wherein one of them extends through the axis 2 of rotation and the axis of the rod 5.

The axis 2 is connected with each aerodynamic surface 3 by a mechanical transmission mounted on the frame 1 and providing a possibility of rotation of the aerodynamic surface 3 together with the rod synchronously and opposite to the rotation of the frame 1.

On the axis 2, a conical toothed wheel 8 is mounted, and a second conical toothed wheel 9 is in engagement with it and fixed on an end of a radial shaft 10 mounted on the frame 1. At the other end of the radial shaft 10, a conical toothed wheel 11 is mounted that is in engagement with a conical toothed wheel 12 mounted on the end of the rod 5. The conical toothed wheels 8, 9, and also 11, 12 are identical.

Oscillations of the aerodynamic surfaces 3 are performed by a mechanical copying mechanism which is composed of a profiled disc 13 mounted on the rod 5, on which the aerodynamic surface 3 is arranged on the cardan joint 4. Vertical plunger-pushers 14 slide over the profiled disc 13 and interact with the aerodynamic surface 3.

Each aerodynamic surface 3 can be twisted relative to the axes which are parallel to the axes 6 and 7 of the cross of the cardan joint 4 and extending through the aerodynamic surface 3, which leads to a production of a moment enhancing the oscillations of the aerodynamic surface 3 and provides a reduction of forces spent for its oscillations and thereby reduces a power applied for the oscillations.

Plane 16 extends through an axis of rotation of the axis 2 and the axis 15 of the rod 5. Plane 17 is perpendicular to the axis 16 and extends through the axis 15. Axes 6 and 7 are perpendicular to the axis 15 and are located in the planes 17 and 16.

The propulsion device operates in the following manner.

The frame 1 together with the aerodynamic surfaces 3 rotates relative to the axis 2 by means of the drive of rotation of the frame 1 with the spiders and the drive chain. Simultaneously each aerodynamic surface 3 together with the rotation of the frame 1 moves along a circumference around the axis 2 and synchronously with the movement along the circumference rotates together with the rod 5 in a direction opposite to the direction of rotation of the frame 1, with an angular speed equal to an angular speed of the movement along the circumference by means of a mechanical transmission. Since the aerodynamic surfaces 3 move rectilinearly, the produced lifting force is distributed on them uniformly, which provides a high energy efficiency of the propulsion device.

During the rotation of the frame 1, the shaft 10 together with the frame 1 moves along the circumference and the conical toothed wheel 9 rolls over the conical toothed wheel 8, and the rotation is transmitted through the conical toothed wheels 11 and 12 to the rod 5 which rotates the aerodynamic surface 3 synchronously with the rotation of the frame 1 in an opposite direction. Rectilinear movement without rotation of the aerodynamic surfaces 3 around the axis 2 is achieved by this.

Each aerodynamic surface 3 performs, synchronously with rotation, oscillations relative to two mutually perpendicular axis 6 and 7 of the cross of the cardan joint 4 perpendicular to the axis 2 of rotation of the frame 1 due to the rotation of the rod 5 and the profiled disc 13, along which the vertical plunger-pushers 14 slide and oscillate the aerodynamic surfaces 3 over predetermined angles, to provide production of a horizontal thrust simultaneously with production of a lifting force, wherein the distribution of the aerodynamic force on the aerodynamic surfaces 3 remains uniform.

The proposed aerodynamic lifting-thrusting propulsion device allows to perform a flight of a flying apparatus with a high energy efficiency.

The invention claimed is:

1. An aerodynamic lifting-thrusting propulsion device, comprising a frame with an axis, relative to which said frame is arranged with a capability of rotation; at least two cardan joints each having a cross; at least two aerodynamic surfaces, each of which is mounted on a respective one of said cardan joints with a capability of oscillations synchronously with a rotation of said frame; a rod mounted on said frame, said cardan joint being connected with said rod, said cross of said cardan joint having axes which are mutually perpendicular and located correspondingly in mutually perpendicular planes intersecting along an axis of said rod, one of said axes planes said cross extending through an axis of the frame and an axis of said rod, said rod being arranged parallel to an axis of said frame, said axis of said frame being connected with each of said aerodynamic surfaces by a mechanical transmission providing a rotation of said aerodynamic surface synchronously and opposite to a rotation of said frame.

2. A dynamic lifting-thrusting propulsion device as defined in claim 1, wherein each of said aerodynamic surfaces is twisted relative to axes which are parallel to axes of said cross and extend through said aerodynamic surface.

* * * * *